(12) United States Patent
Yamada (10) Patent No.: US 10,378,648 B2
(45) Date of Patent: Aug. 13, 2019

(54) SHIFT RANGE CONTROL APPARATUS

(71) Applicant: DENSO CORPORATION, Kariya, Aichi-pref. (JP)

(72) Inventor: Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 62 days.

(21) Appl. No.: 15/492,307

(22) Filed: Apr. 20, 2017

(65) Prior Publication Data

US 2017/0307073 A1   Oct. 26, 2017

(30) Foreign Application Priority Data

Apr. 26, 2016   (JP) .................................. 2016-088293

(51) Int. Cl.
| | |
|---|---|
| H02P 25/08 | (2016.01) |
| F16H 61/32 | (2006.01) |
| H02K 11/215 | (2016.01) |
| F16H 61/12 | (2010.01) |
| F16H 63/38 | (2006.01) |
| F16H 61/24 | (2006.01) |
| F16H 61/00 | (2006.01) |

(52) U.S. Cl.
CPC ............ *F16H 61/32* (2013.01); *F16H 61/12* (2013.01); *F16H 63/38* (2013.01); *H02K 11/215* (2016.01); *H02P 25/0805* (2016.02); *F16H 61/24* (2013.01); *F16H 2061/0053* (2013.01); *F16H 2061/1288* (2013.01); *F16H 2061/247* (2013.01); *F16H 2061/326* (2013.01)

(58) Field of Classification Search
CPC ............... F16H 61/32; F16H 2061/247; F16H 2061/326; H02K 11/215; H02P 25/0805
USPC ....................................................... 318/254.1
See application file for complete search history.

(56) References Cited

U.S. PATENT DOCUMENTS

| | | | | |
|---|---|---|---|---|
| 4,019,107 A * | 4/1977 | Dixon | ................... | H02P 7/2985 318/432 |
| 4,094,385 A * | 6/1978 | Maeda | ...................... | B66B 1/50 187/291 |
| 4,277,735 A * | 7/1981 | Okuyama | ...................... | 318/766 |
| 5,469,215 A * | 11/1995 | Nashiki | ..................... | H02P 6/10 318/432 |
| 5,574,349 A * | 11/1996 | Oh | ........................ | G11B 15/467 318/601 |
| 6,359,415 B1 * | 3/2002 | Suzuki | .................... | H02P 21/00 318/727 |
| 2003/0222617 A1* | 12/2003 | Nakai | ..................... | F16H 61/32 318/701 |

(Continued)

*Primary Examiner* — Eduardo Colon Santana
*Assistant Examiner* — Gabriel Agared
(74) *Attorney, Agent, or Firm* — Nixon & Vanderhye P.C.

(57) ABSTRACT

A control circuit controls driving of a motor to switch over a shift range. A target rotation speed setting part sets a target rotation speed of the motor. A rotation speed detection part detects a present rotation speed, which is an actual rotation speed, of the motor. A rotation speed error calculation part calculates a rotation speed error, which is an error between the target rotation speed and the present rotation speed. A request torque calculation part calculates a request torque for the motor based on the rotation speed error. A phase lead correction value calculation part calculates a phase lead correction value of a current supply phase relative to a rotation phase of a rotor of the motor based on the request torque.

8 Claims, 8 Drawing Sheets

(56) References Cited

U.S. PATENT DOCUMENTS

| | | |
|---|---|---|
| 2004/0066166 A1 | 4/2004 | Nakai et al. |
| 2006/0006827 A1 | 1/2006 | Nakai et al. |
| 2007/0293992 A1* | 12/2007 | Kuwahara ........... F02D 41/1497 701/1 |
| 2011/0238272 A1* | 9/2011 | Kato ..................... B60W 10/06 701/55 |
| 2014/0039742 A1* | 2/2014 | Tanaka ................. B60L 11/007 701/22 |
| 2014/0145665 A1* | 5/2014 | Shouji ................... B60L 15/025 318/503 |
| 2016/0118916 A1* | 4/2016 | Gohara .................. H02P 6/008 318/400.13 |

* cited by examiner

| PARAMETERS | Trqlo | Trqmid | Trqhi |
|---|---|---|---|
| Nrot ≤200rpm | L　S | → | →L |
| Nrot ≤500rpm | ↑ | | |
| Nrot ≤1000rpm | | | |
| Nrot ≤1500rpm | | | |
| Nrot ≤2000rpm | | | |
| Nrot ≤2500rpm | | | |
| Nrot >2500rpm | S | | |

| Nrot \ Trqreq | −30Nm | −20Nm | −10Nm | 0Nm | 10Nm | 20Nm | 30Nm |
|---|---|---|---|---|---|---|---|
| 200rpm | | ... | −5 | −4 | −2 | ... | |
| 500rpm | | ... | −5 | −3 | −1 | ... | |
| 1000rpm | | ... | −4 | −3 | 0 | ... | |
| 1500rpm | | ... | −4 | −2 | 0 | ... | |
| 2000rpm | | ... | −4 | −1 | 2 | ... | |
| 2500rpm | | ... | −5 | −1 | 3 | ... | |
| 3000rpm | | ... | −5 | −1 | 4 | ... | |

FIG. 7B

SHIFT RANGE CONTROL APPARATUS

CROSS REFERENCE TO RELATED APPLICATION

The present application is based on Japanese patent application No. 2016-88293 filed on Apr. 26, 2016, the whole contents of which are incorporated herein by reference.

FIELD

The present disclosure relates to a shift range control apparatus.

BACKGROUND

A conventional shift range control apparatus switches over a shift range by controlling a motor of a shift range switchover device in correspondence to a shift range switchover request from a driver. JP 2004-129452A (US 2006/0006827A1, US 2004/0066166A1) discloses one exemplary shift range switchover device, which uses a switched reluctance motor (SR motor) as a driving power source.

The shift range control apparatus disclosed in JP 2004-129452A controls a rotation speed of the SR motor with a phase lead. Specifically, the shift range control apparatus controls the SR motor to decelerate as it approaches a target angle by calculating a phase lead correction value based on map data indicating a relation between a rotation speed of the SR motor and an error between the target angle of the SR motor and a present angle. According to this method, the map data related to the phase lead correction value is set in correspondence to a shape of a detent plate, which is used as a detent mechanism for restricting rotation of the SR motor, to attain best matching. For this reason, it is complicated to perform a matching operation or difficult to determine the best-matched map data.

SUMMARY

It is therefore an object to provide a shift range control apparatus capable of simplifying matching, which is related to a phase lead correction value.

According to one aspect, a shift range control apparatus for controlling a shift range switchover device, which includes a motor, to switch over a shift range, comprises a target rotation speed setting part, a rotation speed detection part, a rotation speed error calculation part, a request torque calculation part and a phase lead correction value calculation part. The target rotation speed setting part sets a target rotation speed of the motor. The rotation speed detection part detects a present rotation speed, which is an actual rotation speed, of the motor. The rotation speed error calculation part calculates a rotation speed error, which is an error between the target rotation speed and the present rotation speed. The request torque calculation part calculates a request torque for the motor based on the rotation speed error. The phase lead correction value calculation part for calculates a phase lead correction value of a current supply phase relative to a rotation phase of a rotor of the motor based on the request torque.

DETAILED DESCRIPTION OF THE EMBODIMENT

A shift range control apparatus will be described with reference to one embodiment shown in the accompanying drawings.

Figure 1:
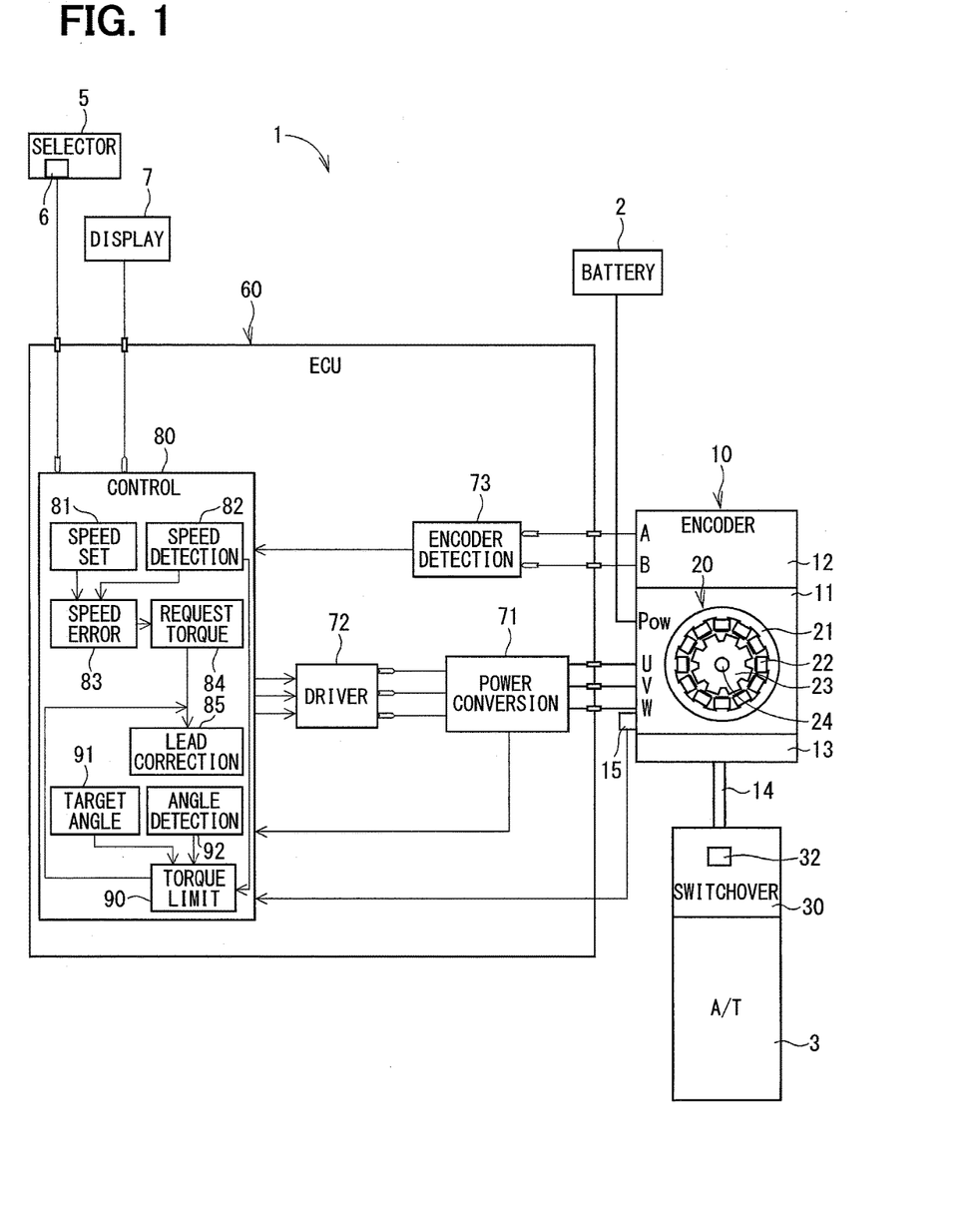
FIG. 1 is a schematic diagram showing a shift range control apparatus according to an embodiment and a shift-by-wire system using the shift range control apparatus.

Referring first to FIG. 1, a shift-by-wire system, which uses a shift range control apparatus according to one embodiment, is designated with reference numeral 1. The shift-by-wire system 1 includes a shift range switchover device 30, an electronic control unit (ECU) 60, which is a shift range control apparatus, and the like. The shift-by-wire system 1 is mounted on a vehicle together with an automatic transmission (A/T) 3, for example, to switchover a shift range of the automatic transmission 3 via by-wire control by driving an actuator 10 of the shift range switchover device 30 in response to a command from a driver of the vehicle.

The actuator 10 includes a housing 11, a motor 20, an encoder 12, a reduction device 13, an output shaft 14 and the like.

The motor 20 is a switched reluctance motor (SR motor), which is for example a three-phase driven type DC brushless motor for generating driving force without using permanent magnets. The motor 20 includes a stator 21, coils 22, a rotor 23, a motor shaft 24, magnets 25 and the like.

The stator 21 is formed in a ring shape by stacking plural iron plates, for example, and accommodated in a manner fixed to an inside wall of the housing 11. The stator 21 has plural (twelve) salient poles, which are spaced apart equi-angularly in a circumferential direction and protruded in a radially inner direction.

The coils 22 are wound about the salient poles of the stator 21. Each coil 22 corresponds to either one of plural phases (U-phase, V-phase and W-phase) of the motor 20. Four of twelve coils 22 correspond to each of the U-phase, V-phase and W-phase.

The rotor 23 is formed in a cylindrical shape by stacking plural iron plates for example and provided rotatably in the stator 21. The rotor 23 has plural (eight) salient poles protruding in a radially outward direction in the stator 21. The salient poles are spaced apart equi-angularly in a circumferential direction.

The motor shaft 24 is fixed to the rotor 23 in the center of the rotor 23 and rotatable with the rotor 23. The motor shaft 24 is supported rotatably by the housing 11. The rotor 23 is thus rotatable with the motor shaft 24 inside the stator 21. By switching over current supply to the coil 22 of each phase, the stator 21 generates a rotating magnetic field to rotate the rotor 23. The motor 20 thus rotates with power supply from a battery 2 provided as an electric power source of the vehicle. The ECU 60 controls driving of the motor 20 by switching over power supply from the battery 2 to the coil 22 of each phase.

The encoder 12 is provided in the housing 11 of the actuator 10. The encoder 12 is formed of a magnet, a magnetism detecting Hall IC and the like. The magnet is rotatable with the rotor 23. The Hall IC is mounted on a substrate, which is fixed to the housing 11, and located to face the magnet for detecting passing of a magnetic flux generating part of the magnet. The encoder 12 outputs an A-phase pulse signal and a B-phase pulse signal in correspondence to change in a rotation angle of the motor 20 (rotor 23). The encoder 12 is an incremental type encoder.

The reduction device 13 transfers rotation of the motor 20 to the shift range switchover device 30 after reducing a rotation speed of the motor shaft 24. The shift range switchover device 30 transfers a rotary driving force outputted from the reduction device 13 to a manual valve 4 and a parking lock mechanism 50, which are shown in FIG. 2.

Figure 2:
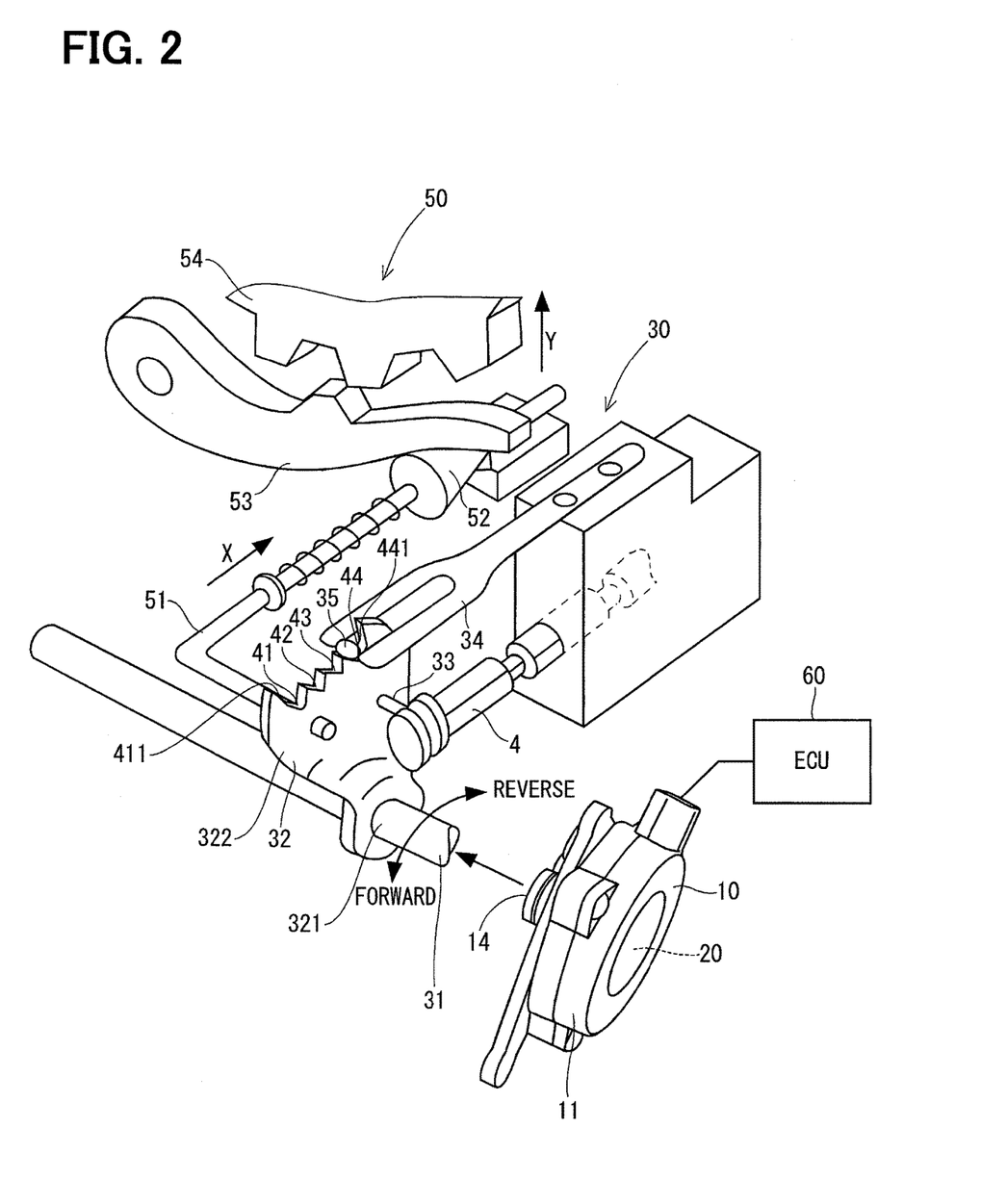
FIG. 2 is a perspective view showing a shift range switchover device, to which the shift range control apparatus according to the embodiment is applied.
Figure 3:
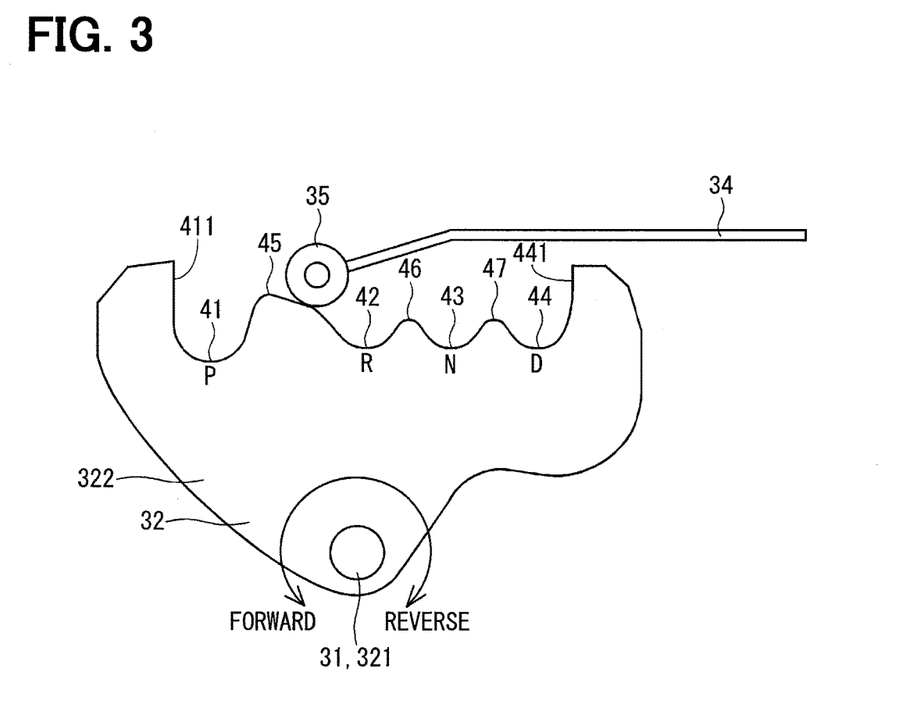
FIG. 3 is a schematic view showing a driven target of a motor of the shift range switchover device shown in FIG. 2.

As shown in FIG. 2, the shift range switchover device 30 includes the actuator 10, a manual shaft 31, a detent plate 32, which is a driven target, a detent spring 34 and the like. The manual shaft 31 is connected to the output shaft 14 of the actuator 10 and rotationally driven by a rotary torque of the motor 20. The detent plate 32 includes a detent shaft 321, a plate part 322, recessed parts 41, 42, 43, 44 and protruded parts 45, 46 and 47, which are shown in FIG. 3.

The detent shaft 321 is formed coaxially and integrally with the manual shaft 31. The torque of the actuator 10, that is, motor 20, is thus applied to the detent shaft 321 through the manual shaft 31. The detent shaft 321 is therefore rotationally driven with the manual shaft 31 by the torque transferred from the motor 20. Since the motor shaft 24 and the detent shaft 321 are connected through the reduction device 13 and the output shaft 14, a certain backlash exists between the motor shaft 24 and the detent shaft 321.

The plate part 322 is formed integrally with the detent shaft 321 and in a generally fan shape, which extends in a radially outward direction from the detent shaft 321. The plate part 322 is thus rotationally driven with the manual shaft 31 and the detent shaft 321 by the motor 20.

A pin 33 is fixed to the plate part 322 in a manner to protrude in generally parallel with the manual shaft 31. The pin 33 is connected to the manual valve 4. As a result, when the detent plate 32 rotates with the manual shaft 31, the manual valve 4 moves reciprocally in an axial direction. That is, the shift range switchover device 30 converts the rotary driving force of the actuator 10 to a linear movement and transfers it to the manual valve 4.

The recessed parts 41, 42, 43 and 44 are formed to be concave from an outer peripheral part toward the detent shaft 321. The recessed part 41 is formed at one circumferential side of the detent plate 32. The recessed part 44 is formed in the other circumferential side of the detent plate 32. The recessed parts 42 and 43 are formed between the recessed part 41 and the recessed part 44. The protruded part 45 is formed between the recessed part 41 and the recessed part 42. The protruded part 46 is formed between the recessed part 42 and the recessed part 43. The protruded part 47 is formed between the recessed part 43 and the recessed part 44.

In the embodiment, the recessed parts 41 to 44 are formed in correspondence to different shift ranges of the automatic transmission 3. Specifically, the recessed part 41 is formed in correspondence to a parking range (P-range, P). The recessed part 42 is formed in correspondence to a reverse range (R-range, R). The recessed part 43 is formed in correspondence to a neutral range (N-range, N). The recessed part 44 is formed in correspondence to a drive range (D-range).

The detent spring 34 is formed resiliently and has a roller 35 as a restricting part at its longitudinal end. The detent spring 34 normally biases the roller 35 toward the detent shaft 321. Thus the roller 35 is pressed to the outer peripheral part of the plate part 322.

When a certain rotary force is applied from the motor 20 to the detent plate 32 in the rotation direction through the manual shaft 31, the roller 35 overrides one of the protruded parts 45, 46 and 47 formed between the recessed parts 41, 42, 43 and 44 and moves to the adjacent one of the recessed part 41, 42, 43 or 44. By thus rotating the manual shaft 31 by the actuator 10, the axial position of the manual valve 4 and a state of the parking lock mechanism 50 are varied thereby to switchover the shift range of the automatic transmission 3. When the roller 35 rides over each of the protruded parts 45, 46 and 47, the detent spring 34 resiliently deforms. At this time, the roller 35 passes the recessed part 41, 42, 43 or 44 and the protruded parts 45, 46 and 47 while rolling.

When the roller 35 fits in any one of the recessed parts 41, 42, 43 and 44 and restricts the detent plate 32 from rotating, the axial position of the manual valve 4 and the state of the parking lock mechanism 50 are fixed. Thus the shift range of the automatic transmission 3, that is, a range position is fixed. As described above, the detent plate 32 and the roller 35 operate as a detent mechanism.

In the embodiment, a direction of rotation of the output shaft 14 of the actuator 10, which switches over the shift range from the P-range side to the R-range, N-range and D-range side as shown in FIG. 2, is assumed to be a forward rotation direction. A direction of rotation of the output shaft 14 of the actuator 10, which switches over the shift range from the D-range side to the N-range, R-range and P-range side, is assumed to be a reverse rotation direction.

As shown in FIG. 3, the recessed part 41, which corresponds to the P-range, has a P-wall 411, which is opposite to the protruded part 45. The recessed part 44, which corresponds to the D-range, has a D-wall 441, which is opposite to the protruded part 47. The P-wall 411 and the D-wall 441 are formed generally in parallel to each other and higher than the protruded parts 45, 46 and 47. For this reason, even when the detent plate 32 rotates in the reverse rotation direction, the roller 35 is not allowed to pass over the P-wall 411 and maintained in contact with the P-wall 411 thereby restricting the rotation of the detent plate 32 in the reverse rotation direction. In the similar manner, even when the detent plate 32 rotates in the forward rotation direction, the roller 35 is not allowed to pass over the D-wall 441 and maintained in contact with the D-wall 441 thereby restricting the rotation of the detent plate 32 in the forward rotation direction. Thus, a movable range of the detent plate 32 corresponds to a relatively movable range of the roller 35 between the P-wall 411 and the D-wall 441.

FIG. 2 shows the state of the parking lock mechanism 50 in a case that the shift range is the D-range, that is, a range other than the P-range. In this state, a parking gear 54 is not locked by a parking lock pawl 53. As a result, rotation of wheels of the vehicle is not restricted. When the output shaft 14 of the actuator 10 is rotated in the reverse rotation direction from this state, a rod 51 fixed to the detent plate 32 is pushed through the detent plate 32 in an arrow direction X shown in FIG. 2. A tapered part 52 formed at the longitudinal end of the rod 51 pushes up the parking lock pawl 53 in an arrow direction Y shown in FIG. 2. As a result, the parking lock pawl 53 is meshed with the parking gear 54 to lock the parking gear 54. Thus the rotation of the wheels of the vehicle is restricted. Under this state, the roller 35 of the detent spring 34 remains fitted in the recessed part 41 of the detent plate 32. That is, the roller 35 is positioned in the center of the recessed part 41 and the actual range of the automatic transmission 3 is set in the P-range.

The ECU 60 will be described next in detail.

The ECU 60 is a small-sized computer, which includes a central processing unit (CPU) as an arithmetic operation unit, a RAM and a ROM as memories, other circuits and input/output circuits. The ECU 60 operates to control various apparatuses and devices by execution of various programs stored in the ROM and the like in accordance with sensor signals outputted from various sensors mounted on the vehicle and various data stored in the ROM and RAM. The ECU 60 is connected electrically to the battery 2, which is the power supply source in the vehicle, to operate with electric power supplied from the battery 2. Each processing of the ECU 60 may be software processing performed by execution of programs pre-stored in the memory such as the ROM or hardware processing performed by dedicated electronic circuits.

As shown in FIG. 1, the ECU 60 includes a power conversion circuit 71, a driver circuit 72, an encoder detection circuit 73, a control circuit 80 and the like.

The power conversion circuit 71 includes plural switching elements such as MOSFETs. In the embodiment, a total of three switching elements are provided in correspondence to each phase of the coils 22 of the motor 20. Three switching elements are connected to coils 22 of U-phase, V-phase and W-phase, respectively.

The driver circuit 72 is connected to each switching element of the power conversion circuit 71. The driver circuit 72 turns on each switching element by outputting an on-signal (driving signal) to a gate terminal of each switching element. Thus each of the switching elements is held in an on-state with the on-signal. In the embodiment, the switching element is held in an off-state when no on-signal is applied to the switching element.

The control circuit 80 is for example an integrated circuit such as a microcomputer.

The control circuit 80 calculates a driving signal for each switching element of the power conversion circuit 71 and controls the driver circuit 72 to output the calculated driving signal. The control circuit 80 is thus capable of controlling on-off state of each switching element.

The control circuit 80 controls driving of the motor 20 by controlling the on-off operation of each switching element through the driver circuit 72.

The encoder detection circuit 73 is connected to the encoder 72. The encoder 12 outputs pulse signals of A-phase and B-phase to the encoder detection circuit 73 in correspondence to a variation of the rotation angle of the motor 20 (rotor 23). The control circuit 80 detects the pulse signals of the encoder 12, which are detected by the encoder detection circuit 73.

As described above, the encoder 12 is the incremental type, which outputs the pulse signal in response to the rotation of the motor 20. The control circuit 80 decreases (counts down) or increases (counts up) a count value (pulse signal count value) in response to the pulse signal outputted from the encoder 12. Thus the control circuit 80 detects a rotation state of the motor 20 (rotor 23). The control circuit 80 is capable of rotating the motor 20 at high rotation speeds without loss of synchronism by detecting the rotation state of the motor 20. Each time the power supply is turned on in the vehicle, that is, each activation of the shift-by-wire system 1, initial driving control is performed for learning a current supply phase of the motor 20, that is, synchronization between the current supply phase and the count value of the pulse signals outputted from the encoder 12. With this initial driving control, the rotation of the actuator 10 is controlled appropriately.

The ECU 60 is connected electrically to a selector sensor 6 of a range selector 5, which is a shift selection part, as shown in FIG. 1.

The selector sensor 6 detects a range, which is referred to as a command range below, commanded by manipulation of the driver of the vehicle on the range selector 5. The selector sensor 6 outputs the detected signal to the control circuit 80 of the ECU 60.

The control circuit 80 determines a target range based on the signal related to the command range outputted from the selector sensor 6. More specifically, the target range is determined based on the signal from the selector sensor 6, a brake signal, a vehicle speed sensor signal and the like. The ECU 60 controls the rotation of the actuator 10 so that the shift range of the automatic transmission 3 is set to the determined target range. That is, the shift range is switched over to the target range by rotating the motor 20 to the target rotation position, which corresponds to the target range. Thus actual range of the automatic transmission 3 is switched over to a range, which the driver intends to set.

Since the encoder 12 is the incremental type, it is only possible to detect a relative rotation position of the motor 20 (rotor 23). For this reason, in switching over the shift range to a desired range by rotating the motor 20, it is necessary to learn a reference position, which corresponds to an absolute position of the motor 20 and match a limit position of a movable range (rotatable range) of the detent plate 32 and the reference position. After learning the reference position of the motor 20, the rotation position of the motor 20 corresponding to each shift range is calculated based on the learned reference position and a predetermined rotation value (control constant) and the motor 20 is rotated to attain the calculated rotation position. Thus the actual range is switched over to the desired shift range. The control circuit 80 of the ECU 60 learns the reference position of the motor 20, which corresponds to the end part (P-range or D-range) in the movable range of the detent plate 32.

After learning the reference position by the reference position learning part 84, the control circuit 80 of the ECU 60 indirectly detects the actual range at that time by calculation based on the learned reference position, the predetermined rotation value and the pulse signal count value (rotation position of the motor 20) applied from the encoder 12. The ECU 60 indicates actual range information on a display device 7, which is provided at a front position relative to a driver's seat in the vehicle. The driver is thus enabled to recognize the actual range from time to time. The actual range is detected based on the rotation position of the motor 20, when the center of the roller 35 is located within respective ranges of the recessed part 41, 42, 43 and 44 of the detent plate 32, which correspond to the shift ranges P, R, N and D.

For learning the reference position, the control circuit 80 rotates the motor 20 until the detent plate 32 stops at the limit position in the movable range, that is, position corresponding to the P-range or D-range. The control circuit 80 learns the reference position of the motor based on the count value of the pulse signals of the encoder 12 at time when a predetermined time elapses after the motor 20 stopped rotating.

The control circuit 80 thus learns the reference position of the motor 20 by rotating the motor 20 until the detent plate 32 stops at the limit position in the movable range. The control related to learning of the reference position by the control circuit 80 is referred to as a reference position learning control. For the reference position learning control, the motor 20 is rotated so that the roller 35 hits the P-wall 411 of the recessed part 41 corresponding to the P-range or the D-wall 441 of the recessed part 44 corresponding to the D-range. The reference position learning control is referred to as a wall-hitting learning control or a pushing learning control below occasionally as well.

The control circuit 80 normally drives the rotor 23 to the target rotation position by supplying electric power to the coils 22 of the motor 20 while detecting the rotation position of the rotor 23 relative to the stator 21 based on the pulse signal count value of the encoder 12. That is, the control circuit 80 switches over the shift range to the target range by driving the motor 20 to rotate while feeding back the rotation state of the rotor 23 (motor 20). This control of the control circuit 80 is referred to as a normal driving control.

As shown in FIG. 1, the control circuit 80 includes as conceptual functional parts a target rotation speed setting part 81, a rotation speed detection part 82, a rotation speed error calculation part 83, a request torque calculation part 84, a target angle calculation part 91, a rotation angle detection part 92, a request torque limitation part 90 and a phase lead correction value calculation part 85.

In the embodiment, the control circuit 80 is connected to the power conversion circuit 71. The control circuit 80 thus detects a voltage Vb applied to the motor 20.

In the embodiment, a temperature sensor 15 is attached to the motor 20. The temperature sensor 15 outputs a signal related to a temperature of the motor 20 to the control circuit 80. The control circuit 80 thus detects the temperature Temp of the motor 20.

Figure 4:
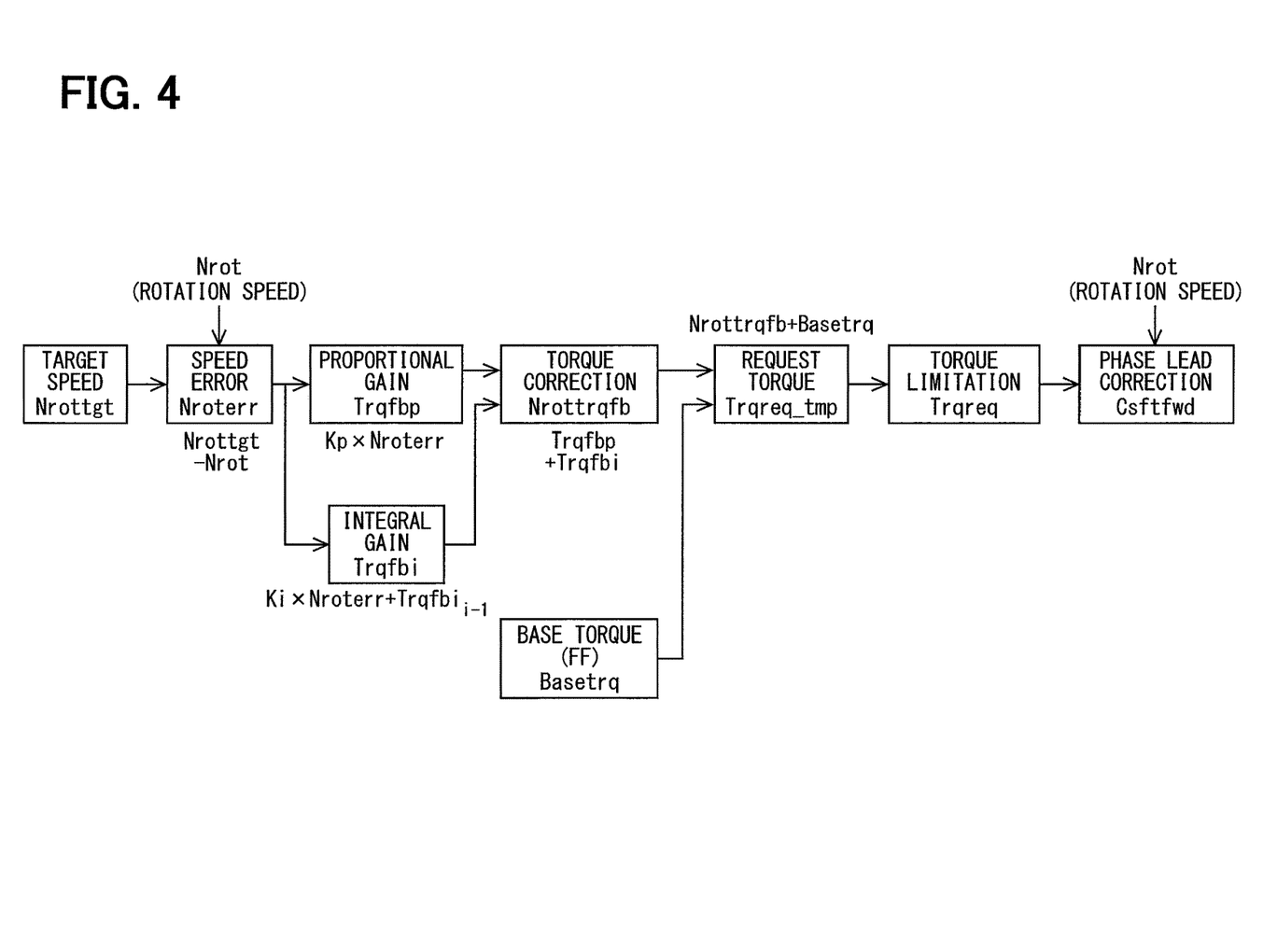
FIG. 4 is a block diagram showing processing of a control circuit of the shift range control apparatus according to the embodiment.

FIG. 4 shows a block diagram related to various processing in normal driving control performed by the control circuit 80.

The control circuit 80 controls the motor 20 by repeating the various processing shown in FIG. 4.

The target rotation speed setting part 81 sets a target rotation speed Nrottgt of the motor 20.

Specifically, the target rotation speed setting part 81 sets the target rotation speed Nrottgt based on parameters predetermined in correspondence to the voltage Vb applied to the motor 20 and the temperature Temp of the motor 20.

The parameters for setting the target rotation speed Nrottgt include a parameter corresponding to a count number for a target shift count and a parameter corresponding to the set target rotation speed. The target shift count is a count value of the pulse signals, which corresponds to the target range. The count number for the target shift count is a difference in the pulse signal count values between the target shift count and a present shift count, that is, the number of counts of the pulse signals to be counted to attain the target shift position.

Figure 5A:
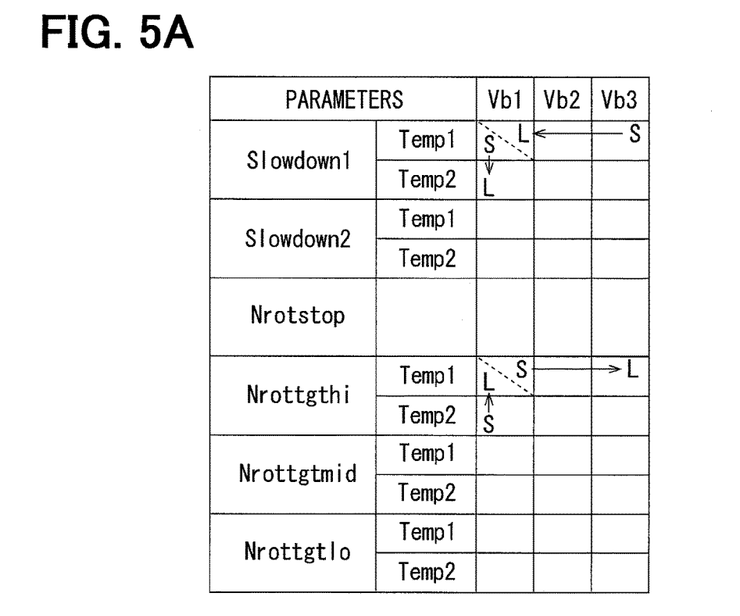
FIG. 5A is a chart showing a relation between a parameter, which corresponds to a count number for a target shift count, and a parameter, which corresponds to a target rotation speed to be set.

As shown in FIG. 5A, as the parameter corresponding to the count number for the target shift count, three kinds of parameters, which are Slowdown1, Slowdown2 and Nrotstop, are set. For each of two parameters, that is, Slowdown1 and Slowdown2, six parameter values are set based on combinations of the voltage Vb applied to the motor 20 (Vb1, Vb2, Vb3: Vb1<Vb2<Vb3) and the temperature Temp of the motor 20 (Temp1, Temp2: Temp1<Temp2). In regard to six parameter values for each of Slowdown1 and Slowdown 2, the parameter value for Temp2 is a large value (L) and the parameter value for Temp1 is a small value (S) for the same voltage, and the parameter value for Vb2 is larger than the parameter value for Vb3 and the parameter value for Vb1 is a large value (L) larger than that of Vb2 for the same temperature. The parameter values of Slowdown2 are set to be smaller than parameter values of Slowdown1. As Nrotstop, a predetermined parameter value, which is smaller than Slowdown2 is set, and is not variable with the voltage applied to the motor 20 and the temperature of the motor 20.

Further, as shown in FIG. 5A, as parameters corresponding to the set target rotation speed, three parameters, that is, Nrottgthi (high target rotation speed), Nrottgtmid (middle target rotation speed) and Nrottgtlo (low target rotation speed) are set. For each of three parameters, that is, Nrotththi, Nrottgtmid and Nrottgtlo, six parameter values are set based on combinations of the voltage (Vb1, Vb2, Vb3: Vb1<Vb2<Vb3) and the temperature (Temp1, Temp2: Temp1<Temp2). In regard to six parameter values for each of Nrottgthi, Nrottgtmid and Nrottgtlo, the parameter value for Temp2 is smaller than the parameter value for Tmep1 for the same voltage, and the parameter value for Vb2 is smaller than the parameter value for Vb3 and the parameter value for Vb1 is smaller than the parameter value for Vb2 for the same temperature. Further, the parameter values of Nrottgtlo are set to be smaller than the parameter values of Nrottgtmid and the parameter values of Nrottgtmid are set to be smaller than the parameter values of Nrottgthi.

The target rotation speed setting part 81 determines the parameter values of Slowdown1, Slowdown2, Nrottgthi, Nrottgtmid and Nrottgtlo based on the voltage Vb applied to the motor 20 and the temperature Temp of the motor 20. For example, the target rotation speed setting part 81 sets the target rotation speed Nrottgt as shown in FIG. 5B based on the parameters shown in FIG. 5A.

Figure 5B:
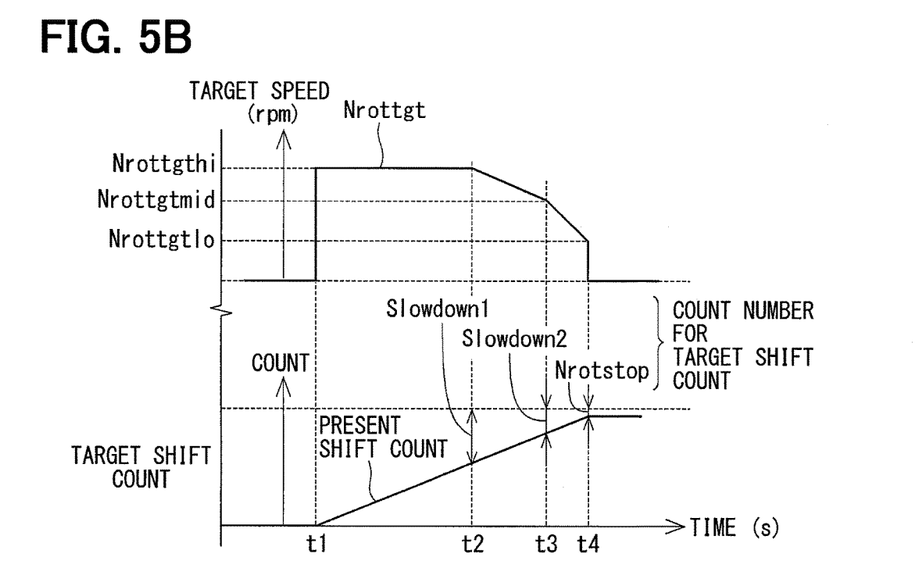
FIG. 5B is a time chart showing an example of setting the target rotation speed.

As shown in FIG. 5B, when the motor 20 is started to be driven at time t1, the count number for the target shift count is larger than that (parameter value) of Slowdown1. Hence the target rotation speed setting part 81 sets the parameter value corresponding to Nrotgthi as the target rotation speed Nrottgt.

When the count number for the target shift count reaches the parameter value of Slowdown1 at time t2, the target rotation speed setting part 81 sets the parameter value smaller than the parameter value of Nrottgthi as the target rotation speed Nrottgt. Thus the Motor 20 is started to decelerate.

From time t2 to time t3, the target rotation speed setting part 81 calculates a parameter value between the parameter values of Nrottgthi and Nrottgtmid by interpolation and sets the parameter value corresponding to a calculated value as the target rotation speed Nrottgt.

When the count number for the target shift count reaches the parameter value of Slowdown2 at time t3, the target rotation speed setting part 81 sets a value smaller than the parameter value corresponding to Nrottgtmid as the target rotation speed Nrottgt.

When the count number for the target shift count reaches the parameter value of Nrotstop at time t4, the target rotation speed setting part 81 sets 0 as the target rotation speed Nrottgt.

The target rotation speed setting part 81 thus sets the target rotation speed Nrottgt based on the parameters, which are predetermined based on the voltage applied to the motor 20 and the temperature of the motor 20. In the embodiment, the target rotation speed Nrottgt is set to decrease as the count number for the target shift count decreases.

The rotation speed detection part 82 detects a present rotation speed Nrot, which is an actual rotation speed of the motor 20 at present time.

Specifically, the rotation speed detection part 82 detects the present rotation speed Nrot based on the pulse signals of the encoder 12, which are detected by the encoder detection circuit 73.

The rotation speed error calculation part 83 calculates a rotation speed error Nroterr, which is a difference between the target rotation speed Nrottgt and the present rotation speed Nrot.

Specifically, the rotation speed error calculation part 83 calculates the rotation speed error Nroterr by subtracting the present rotation speed Nrot detected by the rotation speed detection part 82 from the target rotation speed Nrottgt set by the target rotation speed setting part 81.

The request torque calculation part 84 calculates a request torque Trqreq_tmp for the motor 20 based on the rotation speed error Nroterr.

Specifically, the request torque calculation part 84 performs the following calculation and the like in calculating the request torque Trqreq_tmp.

The request torque calculation part 84 calculates a proportional term value Trqfbp in feedback control based on the following equation (1) by using a proportional gain Kp and the rotation speed error Nroterr calculated by the rotation speed error calculation part 83.

$$Trqfbp = Kp \times Nroterr \quad (1)$$

The request torque calculation part 84 calculates an integral term value Trqfbi in the feedback control based on the following equation (2) by using an integral gain Ki, the rotation speed error Nroterr calculated by the rotation speed error calculation part 83 and a previous integral term value Trqfbii−1.

$$Trqfbi = Ki \times Nroterr + Trqfbii-1 \quad (2)$$

Thus the request torque calculation part 84 proportionally and integrally controls the motor 20 by calculating the proportional term value Trqfbp and the integral term value Trqfbi.

In the embodiment, the request torque calculation part 84 sets Trqfbi=0 during a period from time of starting the shift range switchover control, that is, from starting of driving the motor 20, to time of rising of the rotation speed Nrot to the target rotation speed Nrottgt (Nrottgt≤Nrot) or to time when an absolute value of the count value for the target shift count reaches the parameter value of Slowdown1. Thus it is possible to prevent an integration value from remaining the same, since the target rotation speed is set to be a maximum speed from starting of the shift range switchover to starting of deceleration of the motor 20 and the motor 20 is controlled with a maximum torque until the rotation speed reaches the target rotation speed. It is further possible to start the integral control even in case that the motor 20 is decelerated before reaching the target rotation speed by setting Trqfbi=0 until the absolute value of the count value for the target shift count reaches the parameter value of Slowdown1.

The request torque calculation part 84 calculates a torque correction value Nrottrqfb from a sum of the proportional term value Trqfbp calculated based on the equation (1) and the integral term value Trqfbi calculated based on the equation (2).

The request torque calculation part 84 further determines a base torque Basetrq.

Specifically, the request torque calculation part 84 determines the base torque Basetrq based on a parameter, which is predetermined in correspondence to the rotation speed Nrot of the motor 20.

Figure 6A:
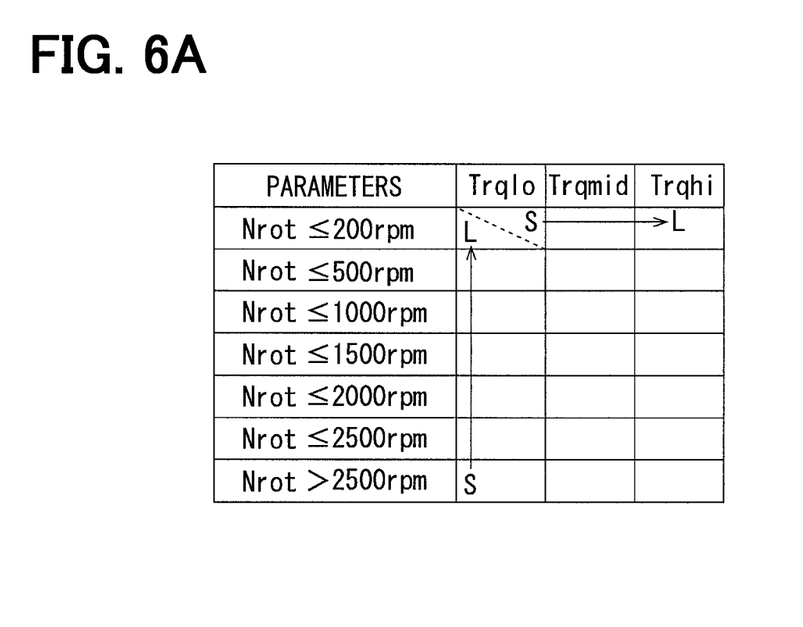
FIG. 6A is a chart showing a parameter for determining a base torque.

As shown in FIG. 6A, three kinds of parameters, that is, Trqlo, Trqmid and Trqhi, are set as parameters for determining the base torque Basetrq. For each of three parameters Trqlo, Trqmid and Trqhi, seven parameters values are set in correspondence to the rotation speed Nrot of the motor 20 (≤200 rpm, ≤500 rpm, ≤1,000 rpm, ≤1,500 rpm, ≤2,000 rpm, ≤2,500 rpm, >2,500 rpm). Seven parameter values for each of Trqlo, Trqmid and Trqhi are set to decrease from a large value (L) to a small value (S) as the rotation speed Nrot of the motor 20 increases. The parameter value of Trqlo is set to a small value (S), which is smaller than the parameter value of Trqmid and the parameter value of Trqmid is set to be smaller than the parameter value of Trqhi, which is a large value (L).

The request torque calculation part 84 determines the parameter values of Trqlo, Trqmid and Trqhi in correspondence to the rotation speed Nrot of the motor 20 detected by the rotation speed detection part 82.

Figure 6B:
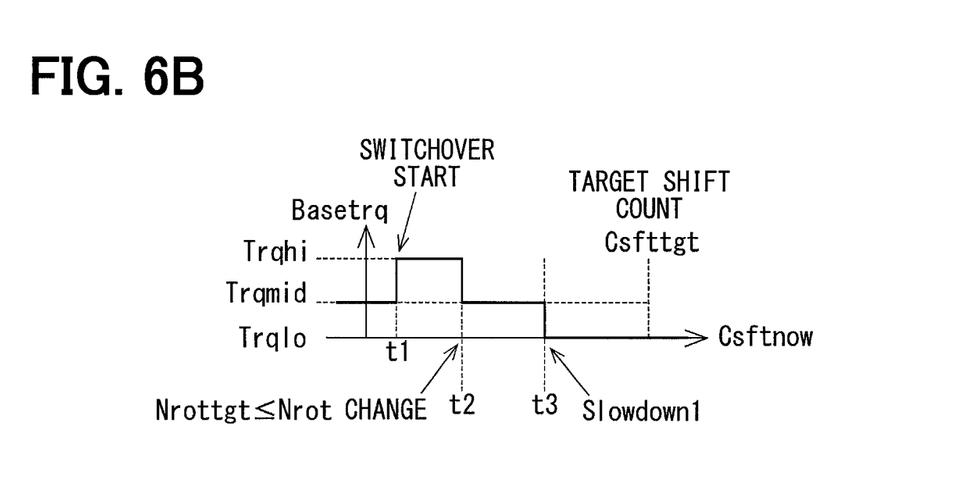
FIG. 6B is a time chart showing an example of determining the base torque.

For example, the request torque calculation part 84 determines the base torque Basetrq based on the parameters shown in FIG. 6A as shown in FIG. 6B.

When the shift range switchover control is started, that is, driving of the motor 20 is started, at time t1 as shown in FIG. 6B, the request torque calculation part 84 sets Trqhi as the base torque Basetrq. When the rotation speed Nrot of the motor 20 reaches or exceeds the target rotation speed Nrottgt at time t2, the request torque calculation part 84 sets the Trqmi as the base torque Basetrq. The count number for the target shift count reaches Slowdown1 at time t3, the request torque calculation part 84 sets Trqlo as the base torque Basetrq.

The request torque calculation part 84 calculates the request torque Trqreq_tmp from a sum of the torque correction value Nrottrqfb calculated as described above and the base torque Basetrq.

The target angle calculation part 91 calculates a target angle, which is a rotation angle of the motor 20, for switching over the shift range to the target range position.

Specifically, the target angle calculation part 91 determines the target range based on a signal, which is outputted from the selector sensor 6 and related to a command range, and sets the rotation angle of the motor 20 corresponding to the determined target range as the target angle.

The rotation angle detection part 92 detects the present rotation angle of the motor 20, which is an actual rotation angle at present time.

Specifically, the rotation angle detection part 92 detects the present rotation angle of the motor 20 based on the count value of pulse signals outputted from the encoder 12.

The torque limitation part 90 limits the request torque to be equal to or smaller than a predetermined upper limit value, when the error between the target angle and the present rotation angle is decreased to be equal to or smaller than the predetermined value.

Specifically, the torque limitation part 90 limits the request torque Trqreq to be equal to or smaller than the predetermined upper limit value (for example, 10 Nm), when the error between the target angle calculated by the target angle calculation part 91 and the present rotation angle detected by the rotation angle detection part 92 is decreased to be equal to or smaller than the predetermined value, that is, when the absolute value of the count number for the target shift count is decreased to be equal to or smaller than Slowdown2, and the rotation speed Nrot of the motor 20 is equal to or higher than a predetermined value (for example, 500 rpm).

The torque limitation part 90 further limits the request torque to be equal to or larger than a predetermined lower limit value, when the present rotation speed of the motor 20 decreases to be equal to or lower than a predetermined rotation speed.

Specifically, the torque limitation part 90 further limits the request torque Trqreq to be equal to or larger than the predetermined lower limit value (for example, 5 Nm), when the present rotation speed Nrot of the motor 20 detected by the rotation speed detection part 82 decreases to be equal to or lower than the predetermined rotation speed (for example, 1,000 rpm).

The phase lead correction value calculation part 85 calculates a phase lead correction value Csftfwd relative to the rotation phase of the rotor of the motor 20 based on the request torque Trqreq.

Specifically, the phase lead correction value calculation part 85 calculates the phase lead correction value Csftfwd based on the request torque Trqreq, which is calculated by the request torque calculation part 84 and limited by the torque limitation part 90, and the present rotation speed Nrot detected by the rotation speed detection part 82 by using a data map storing the phase lead correction value.

Figure 7A:
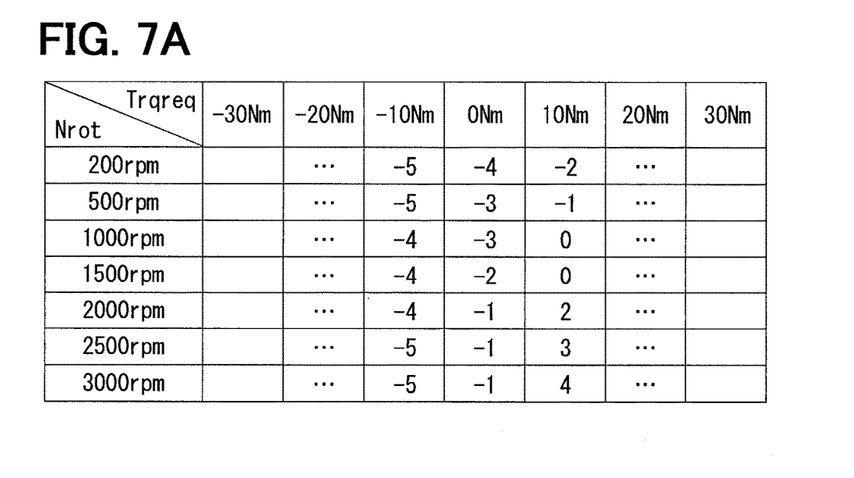
FIG. 7A is a chart showing a data map related to a phase lead correction value.
Figure 7B:
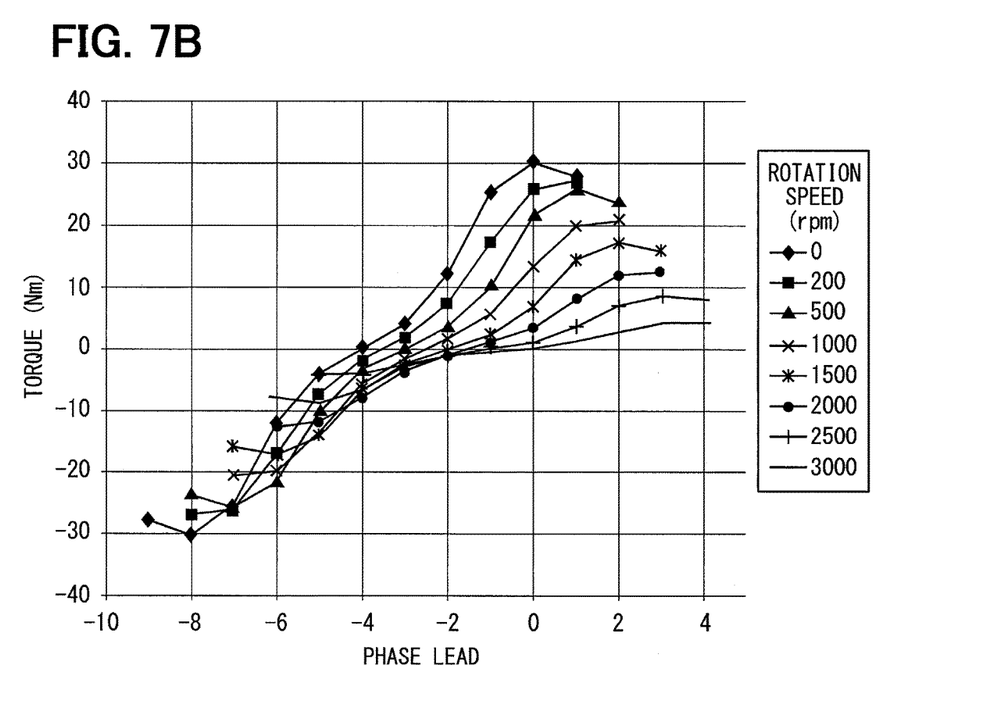
FIG. 7B is a graph showing a characteristic between the phase lead angle and a torque of a motor.

The data map of the phase lead correction value shown in FIG. 7A indicates data, which show a relation of correspondence of the phase lead correction value relative to the request torque Trqreq and the present rotation speed Nrot. This relation is set based on a characteristic related to the torque and the phase lead of the motor 20 shown in FIG. 7B. In the map of the phase lead correction value shown in FIG. 7A, the phase lead correction values for the request torque Trqreq −30 Nm, −20 Nm, 20 Nm and 30 are not shown. In practice, these phase lead correction values are of course set based on the characteristic of the motor 20 shown in FIG. 7B.

The control circuit 80 controls driving of the motor 20 in correspondence to the phase lead correction value Csftfwd calculated by the phase lead correction value calculation part 85.

Figure 8:
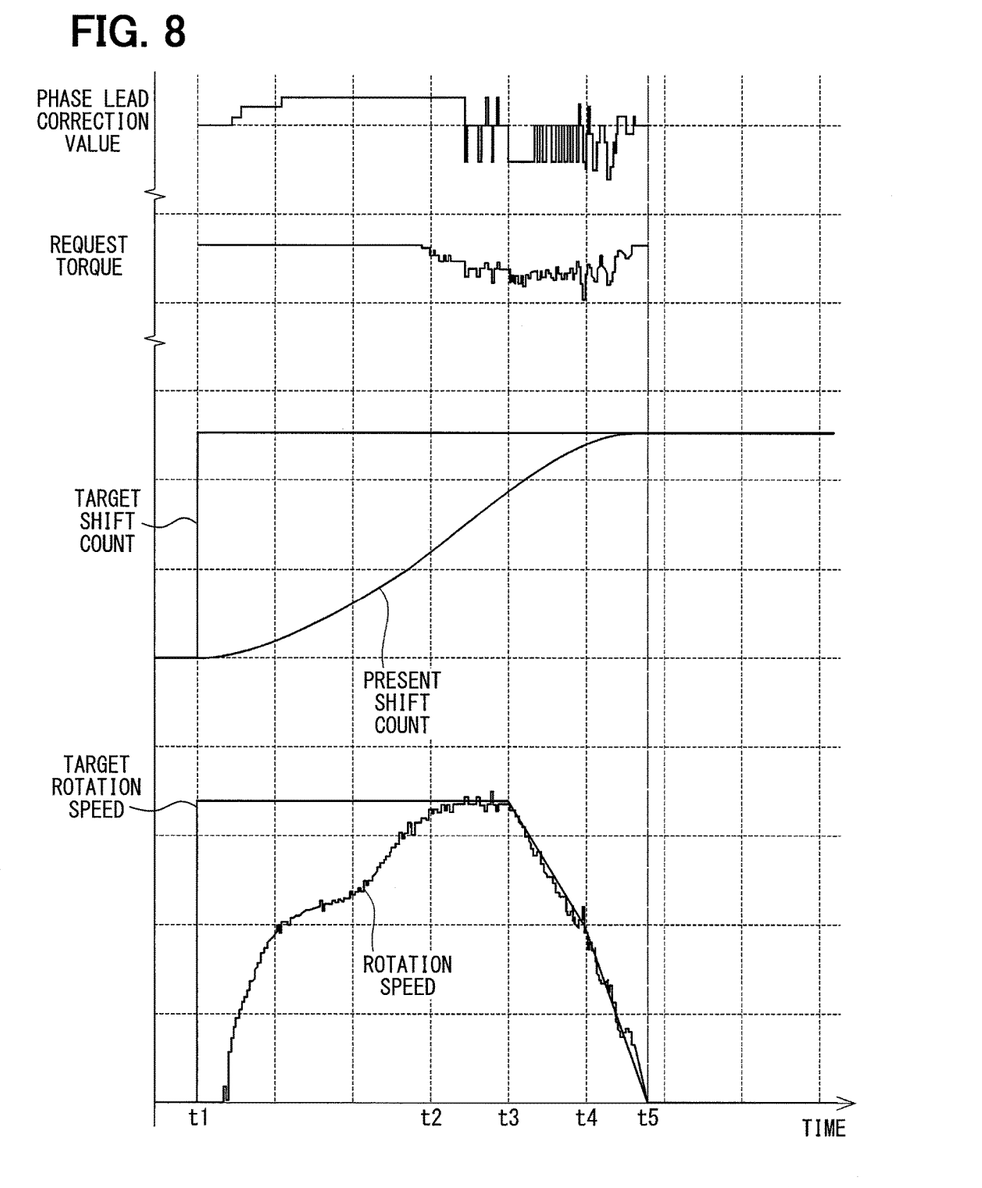
FIG. 8 is a time chart showing one example of motor control performed by the shift range control apparatus according to the embodiment.

One exemplary control of the motor by the ECU 60 in the embodiment will be described next with reference to FIG. 8.

When the driving control for the motor 20 is started at time t1, the target shift count and the target rotation speed of the motor 20 are set to the predetermined values, respectively.

After time t1, the phase lead correction value Csftfwd is calculated based on the request torque Trqreq, the present rotation speed Nrot and the map data of the phase lead correction value and the motor 20 is controlled based on the calculated phase lead correction value Csftfwd.

Until time t2, the motor 20 is controlled such that the rotation speed of the motor 20 increases. The rotation speed of the motor 20 at time t2 reaches around the target rotation speed.

When the count number for the target shift count becomes Slowdown1 at time t3, deceleration of the motor 20 is started.

When the count number for the target shift count becomes Slowdown2 at time t4, the motor 20 is further decelerated.

When the shift count reaches the target shift count at time t5, the motor 20 is stopped.

According to the embodiment, as described above, the ECU 60 switches over the shift range by controlling the shift range switchover device 30 having the motor 20. The ECU 60 includes the control circuit 80, which operates as the target rotation speed setting part 81, the rotation speed detection part 82, the rotation speed error calculation part 83, the request torque calculation part 84 and the phase lead correction value calculation part 85.

The control circuit 80 switches over the shift range by controlling driving of the motor 20.

The target rotation speed setting part 81 sets the target rotation speed Nrottgt of the motor 20.

The rotation speed detection part 82 detects the present rotation speed Nrot, which is the present rotation speed of the motor 20.

The rotation speed error calculation part 83 calculates the rotation speed error Nroterr, which is the error between the target rotation speed Nrottgt and the present rotation speed Nrot.

The request torque calculation part 84 calculates the request torque Trqreq_tmp for the motor 20 based on the rotation speed error Nroterr.

The phase lead correction value calculation part 85 calculates the phase lead correction value of the current supply phase relative to the rotation phase of the rotor 23 of the motor 20 based on the request torque Trqreq_tmp.

According to the embodiment, the phase lead correction value calculation part 85 calculates the phase lead correction value based on the request torque calculated based on the rotation speed error, which is the difference between the target rotation speed and the present speed of the motor 20. It thus not necessary to perform a matching operation, which is normally required for the best matching in correspondence to the shape of the detent plate 32 for restricting the rotation of the motor 20, for example. Further, in case of changing the characteristic of the motor 20, it is made possible to control the rotation speed by feedback-controlling the rotation speed by changing constants of the part of characteristic, which is related to the relation between the torque and the phase lead correction value of the current supply phase relative to the rotation phase of the rotor. It is thus possible to simplify matching related to the phase lead correction value.

According to the embodiment, the target rotation speed setting part 81 sets the target rotation speed Nrottgt based on the voltage applied to the motor 20 and the temperature of the motor 20. As a result, the matching is simplified by converging the rotation speed of the motor to the target rotation speed set based on the voltage and the temperature by the feedback control.

According to the embodiment, the control circuit further includes the target angle calculation part 91, the rotation angle detection part 92 and the request torque limitation part 90.

The target angle calculation part 91 calculates the target angle, which is the rotation angle of the motor 20 for switching over the shift range to the target range position.

The rotation angle detection part 92 detects the present rotation angle of the motor 20, which is the rotation angle at present time. The torque limitation part 90 limits the request torque Trqreq to be equal to or smaller than the predetermined upper limit value, when the error between the target angle and the present rotation angle is decreased to be equal to or smaller than the predetermined value.

The phase lead correction value calculation part 85 calculates the phase lead correction value of the motor 20 based on the request torque Trqreq limited by the request torque limitation part 90. Thus, by limiting the request torque to be equal to or smaller than the predetermined upper limit value when the present rotation angle of the motor 20 approaches the target angle, that is, when the count number approaches the target shift count, it is possible to prevent the rotation speed from excessively exceeding (for example, 100 rpm or more) relative to the target rotation speed (for example, 1,000 rpm) and prevent the torque from excessively increasing at the time of stopping the switchover control (for example, at target count +9 or −9).

Further, according to the embodiment, the torque limitation part 90 limits the request torque Trqreq to be equal to or larger than the lower limit value when the present rotation speed decreases to be equal to or lower than the predetermined rotation speed.

The phase lead correction value calculation part 85 calculates the phase lead correction value of the motor 20 based on the request torque Trqreq limited by the request torque limitation part 90. Thus, by increasing the request torque to be equal to or larger than the lower limit value when the rotation speed of the motor 20 decreases to the predetermined rotation speed, it is possible to prevent the rotation speed decreasing further due to excessive correction.

Further, according to the embodiment, the phase lead correction value calculation part 85 calculates the phase lead correction value based on the request torque and the present rotation speed. Specifically, the phase lead correction value calculation part 85 calculates the phase lead correction value Csftfwd based on the request torque Trqreq, which is calculated by the request torque calculation part 84 and limited by the request torque limitation part 90, the present rotation speed Nrot detected by the rotation speed detection part 82 and the map data of the phase lead correction value.

Still further, according to the embodiment, the motor 20 is a switched reluctance motor. As a result, the motor 20 is configured simply and both of durability and reliability are improved. Since the matching to be performed in relation to the phase lead correction value is simplified, the embodiment is suitable in case that the switched reluctance motor is used as the motor 20.

OTHER EMBODIMENT

In the embodiment, the target rotation speed setting part 81 is exemplified to set the target rotation speed based on the voltage applied to the motor 20 and the temperature of the motor 20. As the other embodiment, however, the target rotation speed setting part 81 may set the target rotation speed based on a predetermined value irrespective of the voltage applied to the motor 20 and the temperature of the motor 20.

In the embodiment, the torque limitation part 90 is exemplified to control the request torque to be smaller than the predetermined upper limit value and to be larger than the predetermined lower limit value under the predetermined condition. As the other embodiment, however, the torque limitation part 90 may control the request torque to be either smaller than the predetermined upper limit value or to be larger than the predetermined lower limit value under the predetermined condition. Further, as the other embodiment, it is possible not to limit the request torque by the request torque limitation part 90.

According to the embodiment, the control circuit 80 includes all of the target rotation speed setting part 81, the rotation speed detection part 82, the rotation speed error calculation part 83, the request torque calculation part 84 and the phase lead correction value calculation part 85 to operate as functional parts.

It is possible as the other embodiment to configure at least one of the target rotation speed setting part 81, the rotation speed detection part 82, the rotation speed error calculation part 83, the request torque calculation part 84 and the phase lead correction value calculation part 85 by hardware such as a dedicated electronic circuit.

In the embodiments described above, it is exemplified that the P-wall 411 of the recessed part 41 and the D-wall 441 of the recessed part 44 are configured in a shape, which does not allow the roller 35 to override even when the detent plate 32 rotates. As the other embodiment, the P-wall 411 and the D-wall 441 may be configured in a shape, which allows the roller 35 to override when the detent plate 32 rotates. In this modification, the movable range of the detent plate 32 is limited to be between two walls by providing such two walls, which contact both end parts of the detent plate 32 in the rotation direction and are capable of limiting the rotation of the detent plate 32. In the reference position learning control in this modification, the reference position is learned by pushing both ends of the detent plate 32 in the rotation direction to at least one of two walls.

In the embodiments described above, it is exemplified that the detent mechanism is formed of the plural recessed parts formed in the detent plate (driven target) provided on the manual shaft and the roller of the detent spring. As the other embodiment, the detent mechanism formed of plural recessed parts and the roller may be provided near the speed reduction device within the actuator, for example.

The number of the recessed parts may be any number. That is, the number of shift ranges of the automatic transmission, to which the shift range control apparatus (ECU 60) is applied, is not limited to four.

As the other embodiment, the shift range control apparatus may be applied to a continuously variable transmission (CVT), which switches over four positions of P, R, N and D similarly to the embodiments described above, or an automatic transmission of a hybrid vehicle (HV). Further, the shift range control apparatus may be applied to an electric vehicle (EV), in which two positions of P and non-P are switched over or to a range switchover of a parking mechanism of the hybrid vehicle.

As the other embodiment, the motor may be a type, which has coils of four or more phases, for example.

In the embodiments described above, it is exemplified that the encoder for detecting the relative rotation position of the motor is the magnetic type encoder. As the other embodiment, the encoder may be an optical type or a brush type, for example. The encoder is exemplified to output the pulse signals of A-phase and B-phase. The encoder may, however, further output a Z-phase signal for use in correction (for indexing) in addition to the A-phase and B-phase.

In place of the encoder, any other detection devices may be used as far as it is capable of detecting the rotation position of the motor.

The shift range control apparatus described above should not be limited to the disclosed embodiments and modifications but may be further modified and varied.

What is claimed is:

1. A shift range control apparatus for controlling a shift range switchover device, which includes a motor, to switch over a shift range, the shift range control apparatus comprising:
   a target rotation speed setting part for setting a target rotation speed of the motor;
   a rotation speed detection part for detecting a present rotation speed, which is an actual rotation speed, of the motor;
   a rotation speed error calculation part for calculating a rotation speed error, which is an error between the target rotation speed and the present rotation speed;
   a request torque calculation part for calculating a request torque for the motor based on the rotation speed error; and
   a phase lead correction value calculation part for calculating a phase lead correction value of a current supply phase relative to a rotation phase of a rotor of the motor based on the request torque, wherein:
   the phase lead correction value calculation part calculates the phase lead correction value based on the request torque and the present rotation speed;
   a driver part for driving the motor by using the phase lead correction value; and
   the phase lead correction value calculation part has a data map defining a relation among the phase lead correction value, the request torque and the present rotation speed and calculates the phase lead correction value with reference to data of the data map.

2. The shift range control apparatus according to claim 1, wherein:
   the target rotation speed setting part sets the target rotation speed based on a voltage applied to the motor and a temperature of the motor.

3. The shift range control apparatus according to claim 1, further comprising:
   a target angle calculation part for calculating a target angle, which is a rotation angle of the motor for switching over the shift range to a target range position;
   a rotation angle detection part for detecting a present rotation angle of the motor, which is a rotation angle at present time; and
   a request torque limitation part for limiting the request torque to be equal to or smaller than a predetermined upper limit value, when the error between the target angle and the present rotation angle is decreased to be equal to or smaller than a predetermined value.

4. The shift range control apparatus according to claim 1, further comprising:
   a request torque limitation part for limiting the request torque to be equal to or larger than the lower limit value when the present rotation speed decreases to be equal to or lower than a predetermined rotation speed.

5. The shift range control apparatus according to claim 1, wherein:
   the motor is a switched reluctance motor.

6. The shift range control apparatus according to claim 1, wherein:
   the motor is connected to rotationally drive a detent mechanism which restricts rotation of the motor.

7. The shift range control apparatus according to claim 1, wherein:
   the request torque calculation part is configured to calculate a torque correction value
   based on the rotation speed error and calculate the request torque by adding the torque correction value to a base torque value.

8. A shift range control apparatus for controlling a shift range switchover device including a switched reluctance motor and a detent mechanism, which is connected to the SR motor and shaped to apply different loading to the SR motor during rotation of the SR motor, the shift range control apparatus comprising:
   a target rotation speed setting part for setting a target rotation speed of the SR motor;
   a rotation speed detection part for detecting a present rotation speed, which is an actual rotation speed, of the SR motor;
   a rotation speed error calculation part for calculating a rotation speed error, which is an error between the target rotation speed and the present rotation speed;
   a request torque calculation part for calculating a request torque for the SR motor based on the rotation speed error, wherein the request torque calculation part includes a torque correction value calculation section for calculating based on the rotation speed error a torque correction value which is added to a predetermined base torque value to calculate the request torque;
   a phase lead correction value calculation part for calculating a phase lead correction value of a current supply phase relative to a rotation phase of a rotor of the SR motor based on the request torque; and
   a driver part for driving the SR motor by variably controlling the phase lead value of the current supply phase in accordance with the phase lead correction value;
   wherein the phase lead correction value calculation part includes a data map defining the phase lead correction value relative to the request torque and the present rotation speed.

* * * * *